(12) United States Patent
Gao et al.

(10) Patent No.: US 12,190,495 B2
(45) Date of Patent: Jan. 7, 2025

(54) MICROSCOPIC NON-DESTRUCTIVE MEASUREMENT METHOD OF MICROSTRUCTURE LINEWIDTH BASED ON TRANSLATION DIFFERENCE

(71) Applicant: NANJING UNIVERSITY OF SCIENCE AND TECHNOLOGY, Nanjing (CN)

(72) Inventors: Zhishan Gao, Nanjing (CN); Jianqiu Ma, Nanjing (CN); Qun Yuan, Nanjing (CN); Yifeng Sun, Nanjing (CN); Xiao Huo, Nanjing (CN); Shumin Wang, Nanjing (CN); Jiale Zhang, Nanjing (CN); Xiaoxin Fan, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 0 days.

(21) Appl. No.: 18/681,461

(22) PCT Filed: Sep. 22, 2023

(86) PCT No.: PCT/CN2023/120678
§ 371 (c)(1),
(2) Date: Feb. 5, 2024

(87) PCT Pub. No.: WO2024/051857
PCT Pub. Date: Mar. 14, 2024

(65) Prior Publication Data
US 2024/0265520 A1    Aug. 8, 2024

(30) Foreign Application Priority Data

Sep. 22, 2022  (CN) .......... 202211157718.2

(51) Int. Cl.
*G06T 7/00*   (2017.01)
*G01N 21/88*  (2006.01)

(52) U.S. Cl.
CPC ....... *G06T 7/0006* (2013.01); *G01N 21/8851* (2013.01); *G01N 2021/8887* (2013.01);
(Continued)

(58) Field of Classification Search
CPC ......... G06T 7/0006; G06T 2207/10056; G06T 2207/20224; G06T 2207/30108; G01N 21/8851; G01N 2021/8887
See application file for complete search history.

(56) References Cited

U.S. PATENT DOCUMENTS

2009/0152661 A1* 6/2009 Kim .................. G03F 1/36
257/E31.127
2012/0113622 A1* 5/2012 Aronson ............ G02B 27/126
359/640

(Continued)

FOREIGN PATENT DOCUMENTS

CN    102300112 A    12/2011
CN    108955572 A    12/2018
(Continued)

OTHER PUBLICATIONS

International Search Report dated Nov. 24, 2023 for International Application No. PCT/CN2023/120678.

*Primary Examiner* — Amara Abdi

(57) ABSTRACT

The present disclosure discloses a microscopic non-destructive measurement method of a microstructure linewidth based on a translation difference, based on a conventional microscopic imaging method, a high-precision displacement platform is used to move a to-be-measured sample, one microscopic image of the sample is acquired before and after the displacement separately, subtraction is performed on the two image to obtain a differential image, a light intensity (Continued)

distribution function of the differential image is derived, data fitting is performed on the differential image, and a high-precision sample linewidth measurement result is obtained by using the characteristic of a high differential pulse positioning resolution. The linewidth measurement method of the present disclosure retains the advantages of intuitiveness, quickness, and non-destructive measurement of the microscopic imaging method, breaks through the microscopic imaging diffraction limit, and reducing the impact of uneven illumination and imaging system noise, thereby improving the linewidth measurement accuracy

5 Claims, 2 Drawing Sheets

(52) U.S. Cl.
CPC ............... *G06T 2207/10056* (2013.01); *G06T 2207/20224* (2013.01); *G06T 2207/30108* (2013.01)

(56) References Cited

U.S. PATENT DOCUMENTS

| | | | |
|---|---|---|---|
| 2014/0131593 A1* | 5/2014 | Nakata | G01N 21/6408 |
| | | | 250/459.1 |
| 2018/0240720 A1* | 8/2018 | Lane | G03F 7/70633 |
| 2018/0267288 A1* | 9/2018 | Sakamoto | G02B 21/34 |
| 2020/0175664 A1* | 6/2020 | Konecky | G06T 7/62 |
| 2022/0118785 A1* | 4/2022 | Ong | B23K 26/362 |

FOREIGN PATENT DOCUMENTS

| | | |
|---|---|---|
| CN | 109751959 A | 5/2019 |
| CN | 113091634 A | 7/2021 |
| CN | 113567441 A | 10/2021 |
| CN | 115479544 A | 12/2022 |
| JP | H09292210 A | 11/1997 |
| JP | H11119107 A | 4/1999 |
| WO | 2021196419 A1 | 10/2021 |

\* cited by examiner

MICROSCOPIC NON-DESTRUCTIVE MEASUREMENT METHOD OF MICROSTRUCTURE LINEWIDTH BASED ON TRANSLATION DIFFERENCE

TECHNICAL FIELD

The present disclosure relates to the field of precise optical measurement engineering technologies, and specifically, to a microscopic non-destructive measurement method of a microstructure linewidth based on a translation difference, aiming at linewidth measurement on linear microstructures and trench microstructures.

BACKGROUND

With the continuous development of micro-nano processing levels, microstructures are becoming increasingly refined currently, and the requirements for linewidth measurement accuracy of linear structures or trench structures are also increasing. The scale of the linewidth measurement method of the present disclosure ranges from several microns to tens of microns, such as a micro-electro-mechanical system (micro-electro-mechanical system, MEMS) and a printed circuit board. In a microelectronic mechanical system, a linewidth error will cause the sensitivity and the stability of an MEMS device to decrease, consequently affecting the product performance. In a printed circuit board, ensuring linewidth is the key to circuit connection reliability and an impedance board impedance value meeting requirements. Therefore, the linewidth, as one of the key indicators of a microstructure device, needs to be measured with higher precision at the micron scale.

According to different measurement principles, existing linewidth measurement methods may be divided into two types: contact type and non-contact type. Although the contact type methods having high resolutions, being in contact with to-be-measured samples are required, and surfaces of the samples may be scratched. The non-contact type methods mainly include scanning electron microscopes based on electron beam imaging and optical measurement methods. Although the scanning electron microscope has a high resolution, the imaging thereof is scanning imaging, and the speed thereof is low, so that it is only applicable to offline measurement, and the electron beam bombardment easily damages a sample. The optical measurement methods mainly include a confocal microscopic imaging method, a through-focus scanning microscopy method, scatterometry, an optical microscopic imaging method, and the like. Methods with relatively high accuracy such as the confocal microscopic imaging method, the through-focus scanning microscopy method, and the scatterometry have low measurement speeds, and some of the methods require modeling and simulation in advance and rely on a degree of matching between modeling and actual measurement. In contrast, in the microscopic imaging method, intuitive imaging is performed on the sample, the field of view is large, plane measurement is performed, the speed is high, the cost is low, and measurement can be performed online. However, limited by the diffraction limit, the step edge positioning is blurred, and it is difficult to improve the accuracy of direct measurement results.

CN201910045878.X discloses a "Linewidth Measurement Method", in which an image of a display substrate is acquired first, then positions of edges of two opposite sides of a to-be-measured line are acquired according to grayscale information of the image, and finally a linewidth of the to-be-measured line is acquired based on the edge positions. The method disclosed in this patent requires setting a threshold. The selection of the threshold will be affected by uneven illumination and noise, and a plurality of times of scanning are required during acquisition of the edge position on one side, so that the measurement time is long.

SUMMARY

The objective of the present disclosure is to provide a microscopic non-destructive measurement method of a microstructure linewidth based on a translation difference, to resolve the problem that the linewidth measurement accuracy in microscopic imaging is limited by an imaging diffraction limit and improve the linewidth measurement accuracy.

In order to achieve the foregoing objective, the present disclosure provides a microscopic non-destructive measurement method of a microstructure linewidth based on a translation difference. Based on a conventional microscopic imaging method, a high-precision displacement platform is used to move a to-be-measured sample, one microscopic image of the sample is acquired before and after the displacement separately, subtraction is performed on the two image to obtain a differential image, a light intensity distribution function of the differential image is derived, data fitting is performed on the differential image, and a high-precision sample linewidth measurement result is obtained by using the characteristic of a high differential pulse positioning resolution.

A microscopic non-destructive measurement method of a microstructure linewidth based on a translation difference is provided, including the following steps:

step 1: acquiring a microscopic image of a to-be-measured microstructure;

step 2: translating the microstructure in a linewidth direction by a short distance, and acquiring a microscopic image of the to-be-measured microstructure again;

step 3: performing subtraction on light intensities of the two acquired microscopic images to obtain a differential image;

step 4: performing data fitting on light intensity data of the differential image by using a Gaussian function as a target, and locating accurate positions of differential pulses on two sides by using Gaussian function extreme points; and step 5: obtaining a high-precision linewidth measurement result according to the accurate positions of the extreme points on the two sides.

The to-be-measured microstructure includes a linear structure and a trench structure, and a scale thereof ranges from several microns to tens of microns.

For that a high-precision displacement platform is used to move a to-be-measured sample, the movement is required to be in a sample linewidth direction, the movement distance is required to be far less than an optical resolution limit of an imaging system and controlled at a nanometer level, and a small displacement may be performed by using, but not limited to, high-precision shifters such as a piezoelectric ceramic displacement platform.

Compared to the prior art, the present disclosure has the following significant advantages:

(1) In the present disclosure, the linewidth result is not directly acquired from the sample microscopic images, but a translation difference is used to convert the linewidth measurement into differential pulse distance measurement, which is not limited by the microscopic imaging resolution, thereby improving the linewidth measurement accuracy.

(2) The translation difference method used in the present disclosure eliminates the impact of both uneven illumination and environmental system noise, thereby improving the accuracy of the measurement result.

(3) In the present disclosure, only two microscopic images need to be acquired, and the measurement speed is high.

DETAILED DESCRIPTION

To make the foregoing objectives, features and advantages of the present disclosure more comprehensible, detailed description is made to specific implementations of the present disclosure below with reference to the accompanying drawings of the specification.

Figure 1:
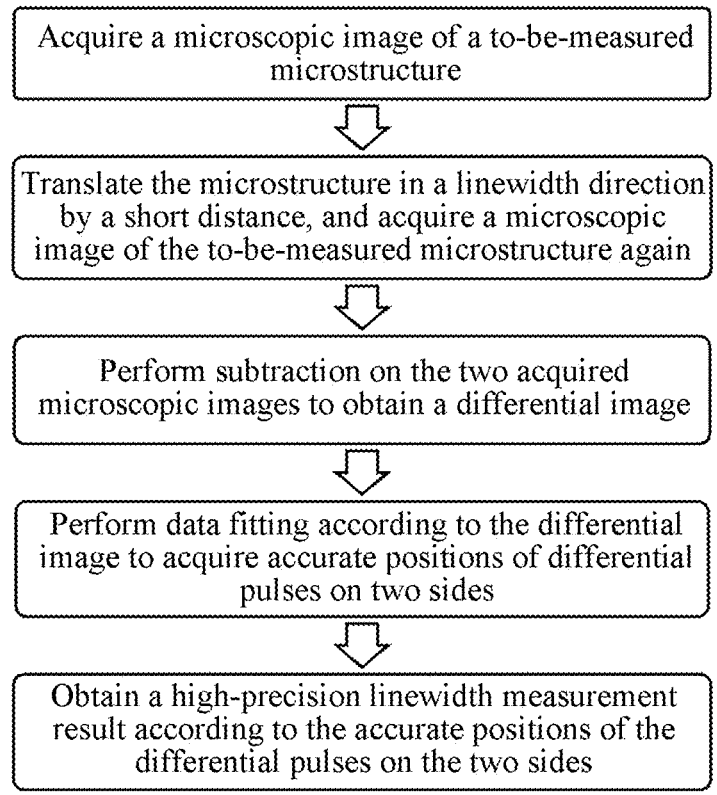
FIG. 1 is a schematic flowchart of a microscopic non-destructive measurement method of a microstructure linewidth based on a translation difference according to the present disclosure.
Figure 2:
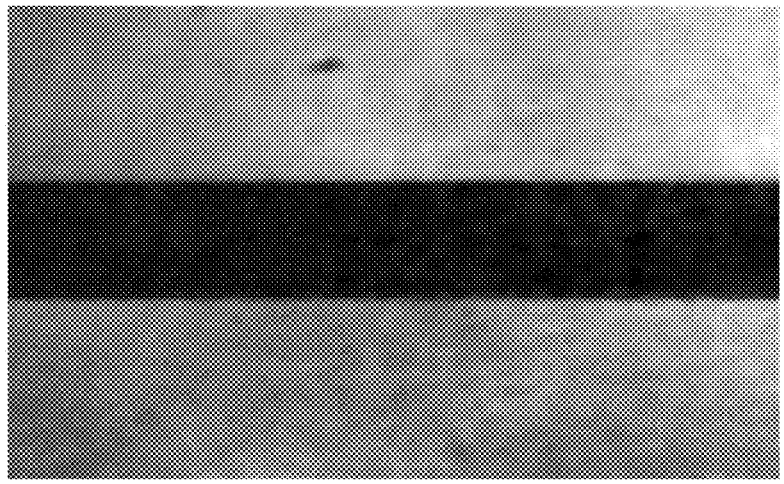
FIG. 2 shows a microscopic image of a to-be-measured microstructure acquired in a microscopic non-destructive measurement method of a microstructure linewidth based on a translation difference according to the present disclosure.

With reference to FIG. 1, a microscopic non-destructive measurement method of a microstructure linewidth based on a translation difference is provided, including the following steps:

Step 1: Acquire a microscopic image of a to-be-measured microstructure. The acquired microscopic image of the to-be-measured microstructure is shown in FIG. 2.

Step 2: Translate the microstructure in a linewidth direction by a short distance, and acquire a microscopic image of the to-be-measured microstructure again, where the translation distance is required to be far less than an optical resolution limit of an imaging system and controlled at a nanometer level, and a small displacement may be performed by using, but not limited to, high-precision shifters such as a piezoelectric ceramic displacement platform.

Step 3: Perform subtraction on the two acquired microscopic images to obtain a differential image.

The light intensity distribution of the differential image is represented by using Formula (1):

$$I_d(x', y') = S(x', y') \cdot [PSF(x', y') \otimes O_d(x, y)] \quad (1)$$

where (x,y) and (x',y') are an object-plane coordinate and an image-plane coordinate respectively, $O_d(x,y)$ represents an object-plane differential function, $I_d(x',y')$ represents an image-plane differential light intensity distribution function, $S(x',y')$ represents impact of uneven illumination, and PSF is a microscopic imaging system point spread function. Because the noise contained in the two images is basically the same, and the noise cancels each other out after the subtraction, the impact of the noise is not considered in the differential image light intensity distribution formula.

The image-plane differential light intensity distribution function is obtained by formula (1), which is obtained through convolution of the object-plane differential function and the microscopic imaging system point spread function. Regardless of the distribution outside the first dark ring of the Airy disk of the imaging system, the system point spread function can be represented by a Gaussian function. When the sample displacement distance is far less than a microscopic imaging system resolution limit, the image-plane differential light intensity distribution function has one positive Gaussian pulse and one negative Gaussian pulse at the sample step edges. The Gaussian pulse has a unique extreme point. A distance between the two Gaussian pulses is equal to a linewidth of the sample.

Figure 3:
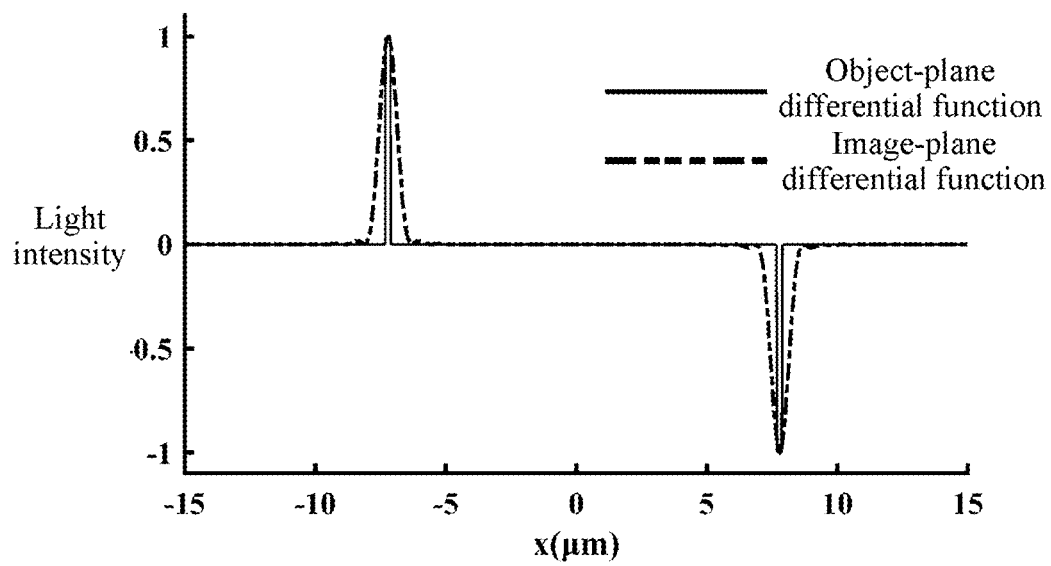
FIG. 3 is a schematic diagram of light intensity distribution of a differential image in a microscopic non-destructive measurement method of a microstructure linewidth based on a translation difference according to the present disclosure.

With reference to FIG. 3, the object-plane differential function has a positive rectangular pulse and a negative rectangular pulse at the sample step edges, the width of the rectangle is equal to the sample displacement distance, and the remaining positions are all 0. The image-plane differential light intensity distribution function is obtained through convolution of the object-plane differential function and the system point spread function. There is one positive Gaussian pulse and one negative Gaussian pulse at the sample step edges. The Gaussian pulse has a unique extreme point. A distance between the extreme points of the two pulses is equal to a distance between the sample step edges, that is, the linewidth.

Step 4: Perform data fitting on light intensity data of the differential image by using a Gaussian function as a target, and locate accurate positions of differential pulses on two sides by using Gaussian function extreme points.

Figure 4:
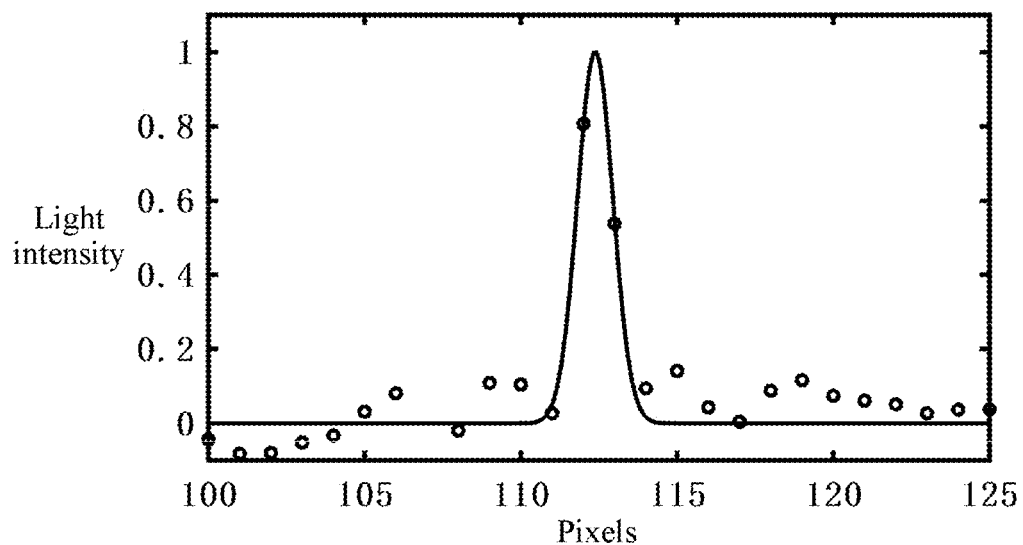
FIG. 4 is a schematic diagram of acquiring accurate positions of step edges on two sides of a to-be-measured microstructure in step 4 of a microscopic non-destructive measurement method of a microstructure linewidth based on a translation difference according to the present disclosure.

With reference to FIG. 4, the performing data fitting on the differential image is because the acquired light intensity image is discrete data, and direct differential results in little effective data, making it impossible to obtain accurate positions of the differential pulse extreme points. The Gaussian function is used as the target to fit the discrete data of the differential image, and based on a Gaussian pulse curve obtained by fitting, positions of the extreme points can be accurately located.

Step 5: Obtain a high-precision linewidth measurement result according to the accurate positions of the extreme points on the two sides.

Based on the above, the present disclosure discloses a microscopic non-destructive measurement method of a microstructure linewidth based on a translation difference, which resolves the problem that a microstructure linewidth measured by using a microscopic imaging method is limited by an imaging diffraction limit and has low measurement accuracy. In the present disclosure, the linewidth result is not directly acquired from the sample microscopic images, but a translation difference is used to convert the linewidth measurement into differential pulse distance measurement, which is not limited by the microscopic imaging resolution, thereby improving the linewidth measurement accuracy. The translation difference method used in the present disclosure eliminates the impact of both uneven illumination and environmental system noise, thereby improving the accuracy of the measurement result. The linewidth measurement method of the present disclosure retains the advantages of intuitiveness, quickness, and non-destructive measurement of the microscopic imaging method, breaks through the microscopic imaging diffraction limit, and reducing the impact of uneven illumination and imaging system noise, thereby improving the linewidth measurement accuracy.

The invention claimed is:

1. A microscopic non-destructive measurement method of a microstructure linewidth based on a translation difference, comprising the following steps:
   step 1: acquiring a microscopic image of a to-be-measured microstructure;
   step 2: translating the microstructure in a linewidth direction by a short distance, and acquiring a microscopic image of the to-be-measured microstructure again;
   step 3: performing subtraction on light intensities of the two acquired microscopic images to obtain a differential image;
   step 4: performing data fitting on light intensity data of the differential image by using a Gaussian function as a target, and locating accurate positions of differential pulses on two sides by using Gaussian function extreme points; and
   step 5: obtaining a high-precision linewidth measurement result according to the accurate positions of the extreme points on the two sides,
   wherein the high-precision sample linewidth measurement result is obtained based on a distance between extreme points of a Gaussian pulse curve obtained by fitting, a positioning resolution of an extreme point is much higher than a system imaging resolution, uneven illumination only affects a pulse height and does not change a pulse position, and a distance between extreme points of two pulses is equal to a distance between sample step edges, that is, a linewidth.

2. The microscopic non-destructive measurement method of a microstructure linewidth based on a translation difference according to claim 1, wherein the to-be-measured microstructure comprises a linear structure and a trench structure, and a scale thereof ranges from several microns to tens of microns.

3. The microscopic non-destructive measurement method of a microstructure linewidth based on a translation difference according to claim 2, wherein for the translating the microstructure in a linewidth direction by a short distance, the translation distance is required to be far less than an optical resolution limit of an imaging system and controlled at a nanometer level.

4. The microscopic non-destructive measurement method of a microstructure linewidth based on a translation difference according to claim 3, wherein the differential image is capable of being represented as being obtained through convolution of an object-plane differential function and a system point spread function.

5. The microscopic non-destructive measurement method of a microstructure linewidth based on a translation difference according to claim 4, wherein fitting target Gaussian function is obtained by simplifying a microscopic imaging system point spread function, only a point spread function within a first dark ring of an Airy disk having obvious Gaussian distribution characteristics is considered, a position of an extreme point coincides with a position of a Gaussian function extreme point, and then the Gaussian function is used as the fitting target to simplify calculation.

* * * * *